Dec. 12, 1961     L. H. KUHLMAN     3,012,379
GRINDING APPARATUS
Filed Sept. 17, 1958     2 Sheets-Sheet 1
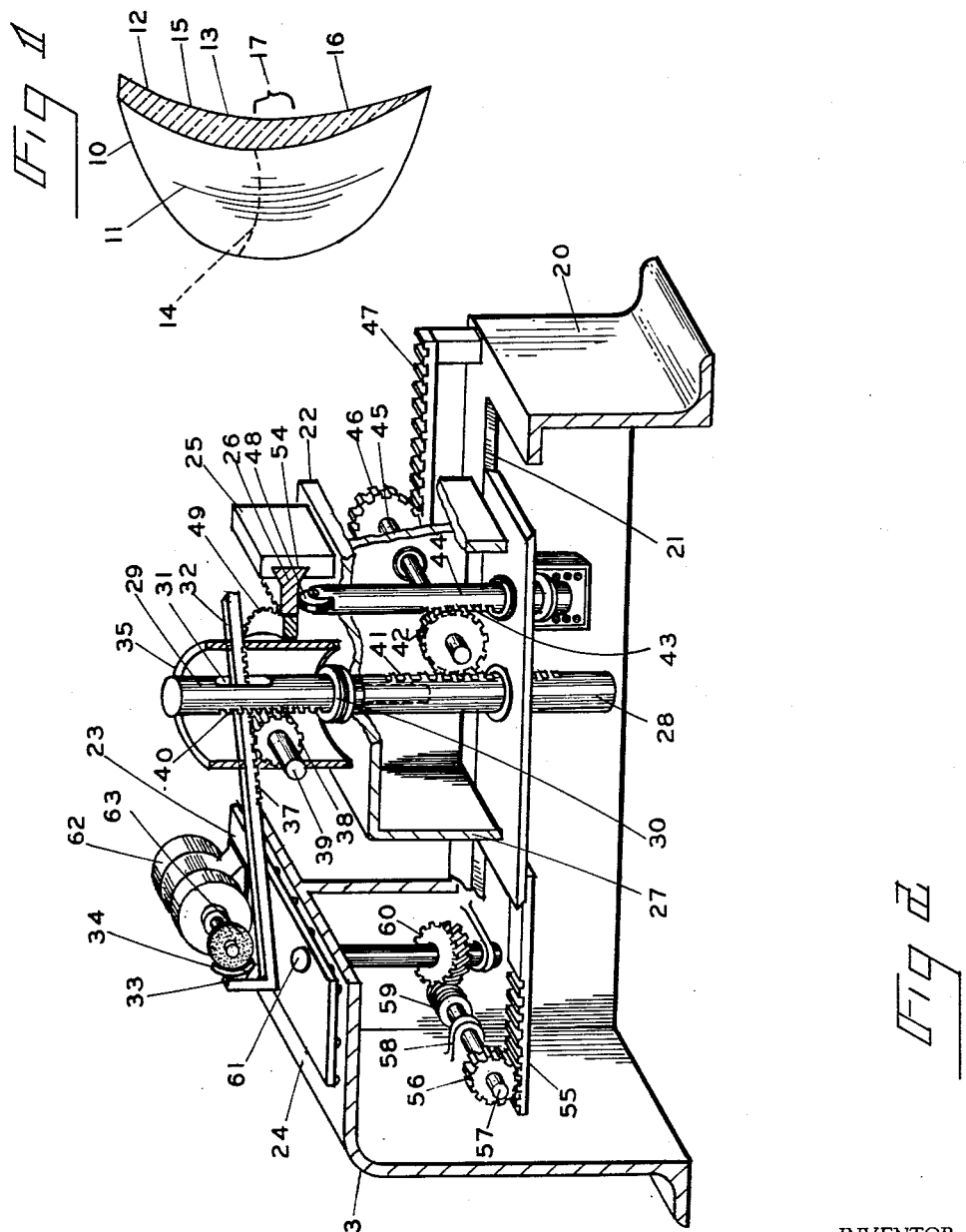
INVENTOR.
LESTER H. KUHLMAN
BY *Norman R. Wissinger*
ATTORNEY

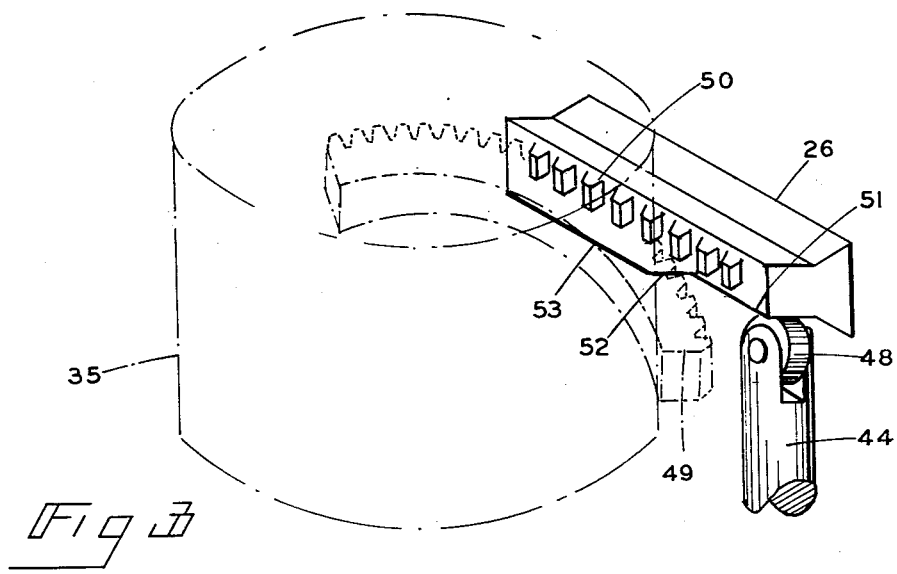
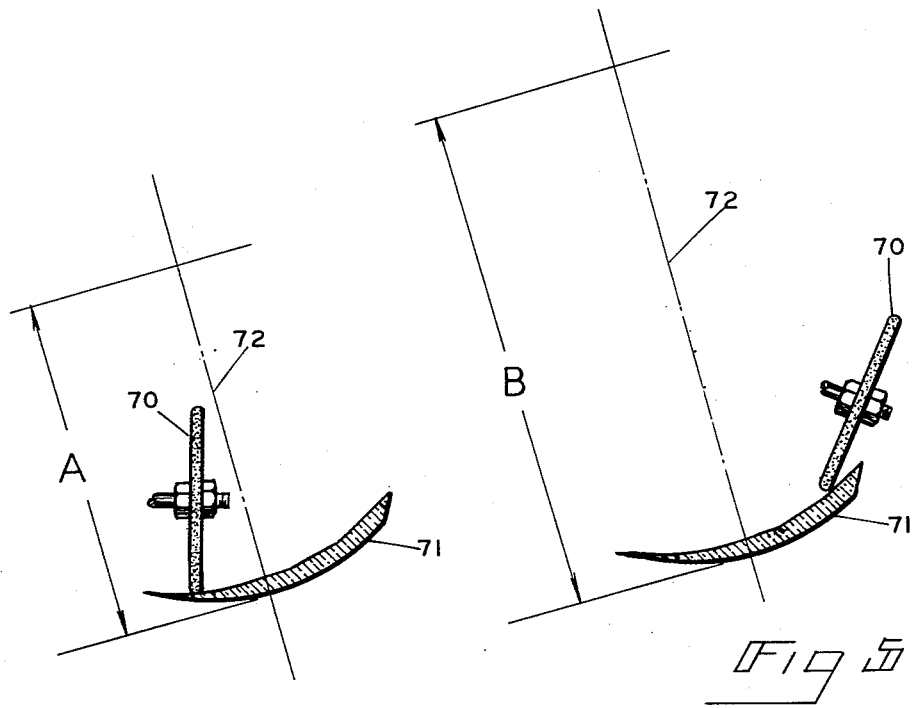

3,012,379
GRINDING APPARATUS
Lester H. Kuhlman, 119 Alton Ave., Dayton 4, Ohio
Filed Sept. 17, 1958, Ser. No. 761,601
9 Claims. (Cl. 51—33)

The present invention relates to ophthalmic lenses, particularly of the multifocal variety and to a grinding apparatus which may be adapted for the manufacture of such lenses.

In the optical art, it is customary to employ lenses having at least one ground surface which is characterized by one or more toric planes. In most cases, this surface, if intersected by horizontal and vertical planes including the lens axis, will present two mutually perpendicular and intersecting curvilinear arcs which have different radii of curvature. Usually the one of these curves having the larger radius of curvature is referred to as the base curve and its plane as the base plane; while the perpendicular curve is referred to as the cross curve and its plane as the cross plane.

Because in ophthalmic use the eye is normally at or near the lens axis and may look through the lens at any portion of the surface thereof, it is preferred that the base plane and cross plane be substantially spherical so that the eye will be benefited by the same degree of magnification regardless of the angle of sight.

Where substantially different degrees of magnification are desired in the same lens, as for example in conventional bifocals, it is necessary that the radius of curvature of the toric planes in the area of greater magnification, sometimes referred to as the "reading portion," should be substantially different from that of the area of less magnification or the "distance portion." In lieu of or complementing this change of curvature, it is also the known practice to employ in the "reading portion" an insert composed of a glass having a different refractory index, thereby to obtain even greater changes in the degree of magnification.

In the multifocal lenses of the prior art, a distinct peripheral line or edge has bounded the portions of different magnification, either as a result of the intersection of the planes of different degrees of curvature or as a result of the use of a distinct and separate insert. This demarcation has been objectionable not only in that the line of division has been visible and has distracted substantially from the appearance of a person wearing such lenses, but also in that, as the eye of the user passed from one area to the other, the sharp change in the magnification has caused abrupt changes in apparent distances to the detriment of regular and reliable perception.

Moreover, because the sharp demarcation provided no intermediate range of magnification, multifocal lenses and even trifocal lenses have been inadequate in that they have not provided just the proper degree of magnification for focusing at each of the infinite number of distances which the human eye may desire to comprehend. For example, while the reading portion of conventional bifocals will accommodate a person reading a newspaper at arm's length and while the distance portion will provide a depth of focus of from five feet to infinity, there has been no focal accommodation for objects lying between the distant limit of the reading range and the nearer limit of the distance range. As a result, the wearer has had to move his head relative to many objects to bring them into one or the other of the distinct focal ranges; and this is usually awkward and embarrassing.

It is accordingly an object of the present invention to provide an apparatus for grinding objects wherein the planes of the ground surface are substantially spherical.

It is a further object of the present invention to provide an apparatus for grinding a multifocal lens wherein the various toric surfaces of different degrees of curvature will be joined by planes of intermediate degrees of curvature which will be uniformly modulated.

It is a further object of the present invention to provide an apparatus for grinding a multifocal lens wherein the areas of different magnification will have no visible lines of demarcation.

It is still a further object of the present invention to provide an apparatus for grinding a multifocal lens wherein the eye may employ the intermediate areas between the different degrees of magnification to obtain a clear focus of objects no matter what their distance from the lens may be.

Yet another object of the present invention is to provide an apparatus for the manufacture of ophthalmic, multifocal lenses wherein the degree of curvature in any given direction along the ground surface of the lens may change gradually without altering the substantially spherical nature of the base plane and the cross plane of such lens.

To achieve these and other objects and advantages of the present invention which will be apparent from a reading of the following disclosure, an ophthalmic lens is proposed which will have substantially spherical base and cross planes which retain a predetermined relationship to each other whether or not the degree of curvature is changed from one portion of the lens to the other. Where there is a change in the curvature of the lens as from a low diopter rating in the upper "distance" portion to a higher diopter rating in the lower "reading" portion, this change will be uniformly graduated and will not create any visible edge or line in the lens and will not cause any erratic changes in magnification as the line of sight of the user passes from one portion to the other.

With regard to the apparatus, in addition to the conventionally employed combination of a grinding wheel capable of rotating in planes at various predetermined degrees of angulation and of a swingable lens arm for carrying the lens or other workpiece across the grinding surface, the present invention provides: (a) means for changing the radius or pivotal length of the swingable lens-carrying arm without changing the spatial relationship between the lens or workpiece and the grinding wheel and (b) means responsive to the same impulse as the first means for changing the angular relationship of the grinding wheel to the lens or workpiece. When the above described means are made to be simultaneously actuated by a single template or other control which may be set up or arranged according to a predetermined pattern before the grinding operation begins, the radius of swing of the lens carrier may be lengthened so as to carry the lens across the grinding wheel in a flatter arc thereby decreasing the diopter rating of the cross curve while the grinding wheel itself is pivoted so that the plane of its rotation intersects the traversing lens at a more acute angle thereby producing a flatter base curve of an equally decreased diopter rating.

One means for simultaneously controlling this length of the radius arm and the relative angular disposition of the grinding wheel according to the present invention is a template consisting of a control surface having linearly displaced surfaces which will be contacted by a guide which is determinative of the relationship between the operative parts of the machine. In one example, the template has a relatively high surface which, as the guide pin follows therealong, will so control the generating components that a relatively sharp curve both vertically and horizontally of the lens will be created and a lower surface which will create a flatter curve. Because the change in the length of the lens-carrying arm does not alter the relationship of the lens to the grinder and is simultaneously coordinated with a related change in the angular disposition of the grinding wheel, the template may have an inclined surface joining the higher and lower surfaces which will cause the generating characteristics of the apparatus to change gradually and uniformly from a high to a low diopter curvature.

The invention thus generally described may be more clearly understood by reference to the following detailed description of certain preferred embodiments thereof in connection with which reference may be had to the appended drawings.

In the drawings:

FIGURE 1 is a perspective view in partial cross section of one preferred form of lens according to the present invention.

FIGURE 2 is a perspective view broken away, showing the basic components of a grinding apparatus suitable for use in connection with the manufacture of lenses of the type illustrated in FIGURE 1.

FIGURE 3 is an enlarged fragmentary view in perspective of a controlling means for the curve generating components of the apparatus shown in FIGURE 2.

FIGURE 4 is a schematic view illustrating the relationship between the workpiece and the curve generating components at the beginning of the sweep of the lens arm where a high diopeter curvature is to be generated.

FIGURE 5 is a schematic illustration showing the components of FIGURE 4 as they are adjusted in the apparatus of the present invention to generate a curve of a lower diopeter rating.

Referring now to FIGURE 1, the ophthalmic lens 10 is shown to comprise roughly parallel broadside surfaces 11 and 12 of which the outer surface 11 in this particular modification may be regarded as the reference surface; i.e., that surface which is already preformed at the time the lens grinding operation begins, and the inner surface 12 is the surface to be ground according to a predetermined pattern or prescription. The lens is shown to be bisected by a vertical plane, the intersection of which with the ground surface 12 forms a curved line 13 which, for the purposes of the following description, will be referred to as the cross curve. If the same lens were bisected by a horizontal plane, the curve formed by the intersection of such plane with the surface, 12, would be what will hereinafter be referred to as the base curve fragmentarily shown and designated by the number 14. The toric plane of which the cross curve 13 is a part is called the cross plane, while the plane of the base curve is known as the base plane.

While the surfaces 11 and 12 are roughly parallel, it will be observed upon closer examination that the spacing between the two surfaces changes as a result of the varying curvatures on the ground surface 12 to obtain the desired variations in degree of magnification. Thus, in the upper or "distance" portion of the lens designated by the number 15, the curvature of the surface 12 follows generally that of the surface 11 so that the two surfaces are in fact substantially parallel. At the bottommost "reading" portion 16 of the lens, it will be seen that the surface 12 has a less pronounced curvature and thereby becomes divergent from the reference surface 11. In the intermediate portion 17 it will be observed further that the spacing between the surfaces 11 and 12 varies constantly by a gradual but uniform change in the curvature of the ground surface 12. In the lens thus constructed, multifocal effects are achieved whereby as the eye looks through the distance portion, it benefits from one degree of magnification whereas, while if it looks through the reading portion, it encounters a greater magnification. At the same time, as the eye passes from the distance portion to the reading portion, it encounters no sharp changes in curvature such as are apt to distort the vision. This same area of graduated curvature may also be employed by sighting through it to focus upon objects which lie between the focal range of the distance portion and that of the reading portion so that the lens according to the present invention provides a complete focal range from reading objects which are held very close to the eye to objects which are an infinite distance from the eye. As will be hereinafter explained, the curvature of the base plane and that of the cross plane will change simultaneously through the intermediate graduated range with the result that an astigmatic effect may be avoided.

Referring now to the apparatus for grinding such a lens, one preferred embodiment of which is illustrated in FIGURES 2 and 3, the same is shown to comprise a fixed, rigid base 20 which provides a track 21 for the sliding reciprocal movement of the carriage assembly 22, and a raised platform 23 for the grinding assembly base 24.

Referring now to the carriage assembly 22, the same is shown to consist of a hollow, block-like base member 27 which rests upon and is slidable longitudinally of the base 20. Passing through and supported in vertical fashion by the base 27 is the shaft 28 having an independently rotatable pivot extension 29 coaxially aligned therewith and telescopically inserted therein, the shaft 28 itself being held against pivotal movement and the extension 29 being rotatably supported upon bearings 30. Through an elongated opening 31 in the shaft extension 29 passes, in substantially perpendicular relationship, the lens carrying arm 32, the forward portion of which carries a lens holding chuck 33 wherein the lens 34 to be ground may be inserted. This same arm 32 passes through horizontally aligned openings in the turret member 35 which is of a generally cylindrical nature and is supported for rotatable movement upon the top of the base 27.

Coming now to the relative movements of the various operative components of the above described carriage assembly, attention is first directed to the means by which the distance of the lens or workpiece 34 from the pivot shaft 29 may be varied without changing the position of the lens relative to the grinding assembly upon the base 24. To accomplish this, the lens arm 32 is provided along its lower portion with gear teeth in the form of a rack 37 which meshes with a spur gear 38 which is rotatably mounted by the shaft 39 in the turret 35. This same spur gear 38 engages a similar rack 40 on the upper pivot bar 29. The lower pivot bar 28, which is so associated with the upper portion 29 that the vertical movement of one will follow that of the other, is also provided with a rack 41 which meshes with a spur gear 42 which in turn meshes with a rack 43 carried by the rider or following bar 44 and is keyed to the shaft 45 which extends across the carriage base 27 and has a second spur gear 46 keyed thereto which second spur gear meshes with a rack 47 carried by the frame member 20. The following bar 44 is vertically slidable through the carriage assembly base 27 and carries a wheel or comparable bearing 48 at its upper extremity. This wheel contacts and is capable of following freely along the template 26 as will be hereinafter described.

Now as the operator swings the lens carrying arm 32 either manually, semiautomatically or automatically, the turret 35 rotates; and, in a manner hereinafter to be described, causes the template 26 to move transversely within the supporting bracket 25 carried by the base 27. With this rotation, the arcuate ring gear 49 affixed to the periphery of the turret will rotate about a vertical axis. Since the template 26 is provided with a rack 50 the teeth of which mesh with the teeth of the ring gear 49, the rotative movement of the turret and ring gear will cause the template 26 to move transversely in a horizontal direction along the bearing wheel 48 of the following bar 44.

As can be seen in FIGURE 3, as the template moves in response to a clockwise rotation of the turret 35, the bearing 48 will slide first along the relatively high template surface 51 and the radius arm 32 will be swinging on its smallest radius of curvature so that the base curve ground by the lens passing along the grinding wheel will have the sharp degree of curvature such as is desired for the distance portion of the lens. Then as the template continues to move in response to the clockwise rotation of the turret 35 the bearing 48 will contact the declining surface 52 of the template and, because the template is held by its grooved track 54 in the bracket 25 against vertical movement, the following bar 44 will be caused to move gradually downwardly at a uniform rate. As the following bar 44 moves downwardly, the teeth 43 thereon will cause the clockwise rotation of the spur gears 42 and 46 which are keyed to a common shaft. The rotation of the gear 42 will cause an elevation of the pivot shaft 28 which will actuate the rack and pinion assembly 38 and 40 which will in turn cause the pivotal length of the lens arm to increase. At the same time, the rotation of the gear 46 meshing with the rack 47 will cause the entire carriage 22 to move rearwardly or away from the grinding wheel. Since the dimensions of the gears 42 and 46 and the teeth thereon and the size and spacing of all of the gear teeth involved in this motion are identical, the rearward travel of the carriage 22 will be equal to the distance that the lens arm 32 moves forward so that, during and after this motion, the lens workpiece remains at a fixed and constant distance from the grinding wheel. During this entire change, however, it will be appreciated that the constant change in the radius of the swing of the lens will result in a constant change in the degree of curvature of the base curve of the lens being ground from the sharper curvature desired in the distance portion of the lens to the graduated portion and ultimately to the flatter or less rounded curve desired in the reading portion of the lens. Finally as the turret 35 continues in its rotation and the flat portion 53 which is the relatively lower portion of the template 26 comes in contact with the bearing 48 and the following bar 44, the following bar 44 being at its lowermost position for the particular grinding operation will hold the radius of swing of the lens arm 32 at the constant maximum radius desired thereby to complete the grinding of the reading portion of the lens.

Now in order that the degree of curvature of the cross curve, as it is generated or ground by the grinding wheel 63 and as it is affected by the angular disposition of this wheel to the lens, the rack extension 55 is provided on the carriage 22 and meshes with the pinion gear 56 which is in turn keyed to a shaft 57 rotatably mounted to the frame by the bracket 58 and carrying the worm 59. As the following bar 44 comes into operative contact with the declining surface 52 of the template 26 and thereby begins to move downwardly and to urge the carriage to move rearwardly or away from the grinding wheel thereby to compensate for the simultaneous elongation of the lens arm 32, the pinion 56 will be rotated in a counterclockwise fashion which will cause the worm 59 to turn the worm gear 60 in a clockwise fashion which motion, as transmitted by the vertical shaft 61 to which the gear 60 is keyed will cause the motor base 24, the motor 62 and the grinding wheel 63 thereon to rotate in a clockwise fashion so that the angular relationship between the grinding wheel and the lens workpiece will become more acute whereby the wheel will present a flatter curvature to the lens surface to be ground and will result in a less severe degree of curvature. In this rotation of the motor and grinding assembly base 24, it is important that the pivot point therefor, as established by the center or axis of rotation of the shaft 61, should lie in the plane of the cutting edge of the grinding wheel 63 so that the spatial relationship between the grinding member and the traversing lens will be constant and only the angular relationship will be changed.

The above described correlation between the length of the lens swing arm and the angular disposition of the grinding member relative to the lens or workpiece is best illustrated in FIGURES 4 and 5 wherein FIGURE 4 illustrates the first stages of the grinding operation wherein the more sharply curved surface is being ground and FIGURE 5 illustrates the final stages of the grinding operation whereby the reading portion of the lens having a lower degree of curvature is being generated. In FIGURE 4 it will be noted that the plane of rotation of the grinding member 70 is substantially perpendicular to the surface of the lens 71 being contacted thereby to get the sharpest degree of curvature on the cross curve simultaneous with the imparting thereto of a base curve of the sharpest curvature which is responsive to the pivotal length A of the swing arm schematically designated by the number 72. Then in FIGURE 5 as the lens has substantially traversed the grinding wheel, it is shown that the angular relationship between the plane of rotation of the grinding wheel 70 with the surface of lens 71 being ground is more acute so that a flatter curve is being generated simultaneously with the swinging of the lens about a longer pivotal distance B which will make the base curve of a greater radius of curvature or flatter thereby to increase the spacing between the front and back surfaces and to provide the greater magnification desired in the reading portion of the lens. Although the lens swinging arm 32 is shown in FIGURE 2 to be relatively long, for the sake of clarity, it will be understood that where, as in most cases, a relatively shorter radius of curvature is desired for the ground surface, the arm may be shortened by simple engineering and design changes in the relative spacing of the turret 35 and the grinding assembly.

While the foregoing invention has been described in considerable detail in connection with certain preferred embodiments thereof, it is to be understood that the foregoing particularization and detail have been for the purposes of illustration only and in no way limit the scope of the invention as it is more particularly defined in the subjoined claims.

I claim:
1. An apparatus for the generation of toric surfaces comprising a pivotally mounted grinding wheel, a pivotally mounted arm swingable upon an axis parallel to the pivotal axis of said grinding wheel, a chuck on the end of said arm for holding a workpiece, first means for changing the distance between said chuck and the pivotal axis of said arm and second means responsive to said first means for automatically and simultaneously maintaining the spatial relationship between said chuck and said grinding wheel.

2. An apparatus according to claim 1 wherein said means are operative while said grinding wheel is in contact with and grinding said workpiece.

3. An apparatus according to claim 1 wherein said first means are for moving the pivotal axis of said arm away from said grinding wheel and said second means are for elongating said arm.

4. An apparatus for the generation of toric surfaces comprising a pivotally mounted grinding member, a pivotally mounted arm swingable upon an axis parallel to the pivotal axis of said grinding member, a chuck on the end of said arm for holding a workpiece, said arm being spaced from said grinding member to allow a workpiece held in said chuck to be swung across said grinding member, first means for changing the distance between said chuck and the pivotal axis of said arm and second means responsive to said first means for automatically and simultaneously maintaining the spatial relationship between said chuck and said grinding member and means for changing the angular relationship between said grinding member and said chuck.

5. An apparatus according to claim 4 having actuating means for simultaneously influencing the means for changing the distance between said chuck and the pivotal axis of said arm and the means for changing the angular relationship between said grinding member and said chuck.

6. An apparatus according to claim 5 wherein said actuating means comprise a slidably mounted template, the guiding movement and position of which is responsive to the movement and position of said pivotally mounted arm.

7. An apparatus for the manufacture of items having one or more toric surfaces comprising a pivotally mounted base, a grinding disc rotatably mounted upon said base, the rotational axis of said disc being perpendicularly disposed to the pivotal axis of the said base and the pivotal axis of said base being in the plane of rotation of said disc, a swing arm pivotally mounted about an axis parallel to the pivotal axis of said base, means at one end of said arm for supporting a workpiece, first means for changing the length of said arm between its pivotal axis and the workpiece and simultaneously acting second means responsive to said first means for moving the pivotal axis of said arm to maintain the position of the workpiece in grinding relationship with said disc.

8. An apparatus for the manufacture of multifocal ophthalmic lenses comprising a frame member having a platform and a sliding track, a carriage assembly, slidably mounted upon said track, said carriage assembly comprising a base, a turret member rotatably mounted on said base and a template receiving bracket projecting from said base, a pivotally mounted grinding assembly having a rotatably driven grinding member upon said platform, a template slidably mounted in said bracket, a lens carrying arm slidably positioned through said turret member, a gear rack upon said template, a pinion gear about the outer periphery of said turret assembly meshing with the rack on said template, a template following bar vertically slidable through said carriage assembly, one end of which bar is urged against the guiding surface of said template, a second rack associated with said following bar, a second pinion gear meshing with said second rack on said following bar for simultaneously moving said carriage assembly away from said platform and extending said arm toward said platform by equivalent distances, a third rack extending from said carriage assembly toward said platform, a third pinion gear meshing with said third rack, a worm and worm gear associated with said third pinion gear for pivoting said platform simultaneously with the sliding movement of said turret assembly, whereby a swing of the lens carrying arm and turret member will result in a shifting of the template to bring a thicker portion thereof into contact with the following bar thereby forcing the same away from the template and simultaneously moving the carriage assembly away from the platform, elongating the arm toward the platform and causing the grinding assembly upon said platform to rotate in a clockwise direction.

9. An apparatus according to claim 8 wherein said template has a guiding surface consisting of a relatively raised portion, a relatively lower portion and an inclined surface connecting said portions whereby the curvature generated by the passage of the lens carrying arm across the face of the grinding member will be sharper when the following bar is acting against the raised portion, will be flatter when the following bar is operating against the lowered portion and will constantly change in uniform graduations as the following bar traverses the inclined surface.

References Cited in the file of this patent
UNITED STATES PATENTS

| | | |
|---|---|---|
| 1,023,513 | Gonard | Apr. 16, 1912 |
| 1,143,316 | Poulain et al. | June 15, 1915 |
| 2,109,474 | Evans | Mar. 1, 1938 |
| 2,112,836 | Evans | Apr. 5, 1938 |
| 2,212,179 | Martin | Aug. 20, 1940 |
| 2,403,659 | Hayward | July 9, 1946 |
| 2,633,675 | Ellis | Apr. 7, 1953 |